United States Patent
Ren et al.

(10) Patent No.: US 10,187,812 B2
(45) Date of Patent: Jan. 22, 2019

(54) DATA TRANSMISSION METHOD, BASE STATION AND USER EQUIPMENT

(71) Applicant: Huawei Technologies Co., Ltd., Shenzhen (CN)

(72) Inventors: Xiaotao Ren, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 15/073,408

(22) Filed: Mar. 17, 2016

(65) Prior Publication Data

US 2016/0205564 A1    Jul. 14, 2016

Related U.S. Application Data

(63) Continuation of application No. PCT/CN2013/083776, filed on Sep. 18, 2013.

(51) Int. Cl.
*H04W 24/02*    (2009.01)
*H04J 11/00*    (2006.01)
(Continued)

(52) U.S. Cl.
CPC ............ *H04W 24/02* (2013.01); *H04J 11/00* (2013.01); *H04L 1/00* (2013.01); *H04L 27/362* (2013.01);
(Continued)

(58) Field of Classification Search
CPC .......... H04J 11/00; H04L 1/0003; H04L 5/00; H04L 5/0057; H04L 27/36; H04L 1/00;
(Continued)

(56) References Cited

U.S. PATENT DOCUMENTS

2005/0208973 A1    9/2005 Lochi
2009/0163142 A1    6/2009 Pi et al.
(Continued)

FOREIGN PATENT DOCUMENTS

CN    103297181 A    9/2013
JP    2012109843 B1    6/2012
(Continued)

OTHER PUBLICATIONS

"Consideration on High Order Modulation for Small Cell," Source: ZTE, Agenda Item: 7.3.5.2, Document for: Discussion & Decision, 3GPP TSG-RAN WG1 Meeting #72, R1-130136, Jan. 28 through Feb. 1, 2013, 6 pages.
(Continued)

*Primary Examiner* — Andrew Lai
*Assistant Examiner* — Leon Andrews
(74) *Attorney, Agent, or Firm* — Slater Matsil, LLP

(57) ABSTRACT

A data transmission method includes: selecting one modulation coding scheme (MCS) table from at least two MCS tables to determine an MCS, and selecting one transport block size (TBS) table from at least two TBS tables to determine a TBS, where at least one MCS table of the at least two MCS tables includes an MCS corresponding to 256 quadrature amplitude modulation QAM, and sending service data to user equipment based on the determined MCS and the determined TBS.

22 Claims, 5 Drawing Sheets

(51) Int. Cl.
*H04L 27/36* (2006.01)
*H04W 72/04* (2009.01)
*H04W 72/12* (2009.01)
*H04W 28/00* (2009.01)
*H04L 1/00* (2006.01)
*H04W 28/18* (2009.01)
*H04W 88/02* (2009.01)
*H04W 88/08* (2009.01)

(52) U.S. Cl.
CPC ......... *H04W 28/00* (2013.01); *H04W 28/18* (2013.01); *H04W 72/0453* (2013.01); *H04W 72/1257* (2013.01); *H04W 88/02* (2013.01); *H04W 88/08* (2013.01)

(58) Field of Classification Search
CPC ..... H04W 24/02; H04W 28/02; H04W 72/04; H04W 72/12; H04W 72/14
See application file for complete search history.

(56) References Cited

U.S. PATENT DOCUMENTS

| | | | |
|---|---|---|---|
| 2013/0237235 A1 | 9/2013 | Nagata et al. | |
| 2014/0192732 A1* | 7/2014 | Chen | H04L 1/0003 370/329 |
| 2015/0016553 A1 | 1/2015 | Yang et al. | |
| 2015/0200746 A1* | 7/2015 | Pan | H04L 1/00 370/329 |
| 2017/0012735 A1 | 1/2017 | Yang et al. | |
| 2017/0111928 A1* | 4/2017 | Song | H04W 72/14 |
| 2017/0366297 A1 | 12/2017 | Futagi et al. | |

FOREIGN PATENT DOCUMENTS

| | | |
|---|---|---|
| WO | 2009087743 A1 | 7/2009 |
| WO | 2013123961 A1 | 8/2013 |
| WO | 2013127303 A1 | 9/2013 |

OTHER PUBLICATIONS

Flore, D. (TSG-RAN Chairman), "RAN#61 Status Report," 3GPP TSG SA #61, SP-130475, Porto, Portugal, Sep. 9-11, 2013, 36 pages.

"On Small Cell Enhancement for Improved Spectral Efficiency," Agenda Item: 7.3.5.2, Source: HTC, Document for: Discussion and Decision, 3GPP TSG RAN WG1 Meeting #72, R1-130311, St. Julian's. Malta, Jan. 28-Feb. 1, 2013, 4 pages.

"Discussion on 256QAM for Downlink in Small Cell Deployments," Source: Panasonic, Agenda Item: 7.2.5.2.3, Document for: Discussion, 3GPP TSG-RAN WG1 Meeting 72bis, R1-131328, Apr. 15-19, 2013, Chicago, 6 pages.

\* cited by examiner

DATA TRANSMISSION METHOD, BASE STATION AND USER EQUIPMENT

This application is a continuation of International Application No. PCT/CN2013/083776, filed on Sep. 18, 2013, which is hereby incorporated by reference in its entirety.

TECHNICAL FIELD

The present invention relates to the communications field, and in particular, to a data transmission method, a base station and user equipment.

BACKGROUND

In a communications system, a state of a channel from a base station to user equipment decides a size of a throughput from the base station to the user equipment. An index measuring the channel state is a modulation coding scheme (MCS) level that can be supported. A better channel state indicates a higher supported MCS level, and a worse channel state indicates a lower supported MCS level. In a mobile communications system, affected by mobility and an environment of user equipment, a channel from a base station to the user equipment is changeable, and therefore a supported MCS level is also changeable. In a relatively bad channel state, if a relatively high MCS level is used during data transmission, a resulting frame error rate is relatively high, which does not satisfy any index requirement of the system. In a relatively good channel state, if a relatively low MCS level is used during data transmission, a throughput from a base station to user equipment is affected, thereby affecting a throughput of the system. Therefore, in a mobile communications system, an adaptive modulation and coding (AMC) method is generally used, so that an MCS Level applicable to a link from a base station to user equipment is adaptively adjusted according to a state of a channel from the base station to the UE, thereby optimizing the system throughput. An MCS level may be determined based on an MCS table and a transport block size (TBS) corresponding to the MCS level needs to be determined based on a TBS table.

The presented embodiments provide system and method to determine an MCS level and a TBS based on an MCS table and a TBS table, so as to maximize frequency spectrum efficiency.

SUMMARY

Embodiments provide a data transmission method, a base station and user equipment, which can maximize frequency spectrum efficiency of a system and maximize a throughput of the system.

A first aspect provides a data transmission method, including: selecting one MCS table from at least two modulation coding scheme MCS tables to determine an MCS, and selecting one TBS table from at least two transport block size TBS tables to determine a TBS, where at least one MCS table of the at least two MCS tables includes an MCS corresponding to 256 quadrature amplitude modulation QAM; and sending service data to user equipment based on the determined MCS and the determined TBS.

With reference to the first aspect, in a first possible implementation manner of the first aspect, the selecting one MCS table from at least two modulation coding scheme MCS tables to determine an MCS, and selecting one TBS table from at least two transport block size TBS tables to determine a TBS includes: determining a release of a Long Term Evolution LTE system in which the user equipment is located; and selecting the one MCS table from the at least two MCS tables and selecting the one TBS table from the at least two TBS tables according to the release of the LTE system in which the user equipment is located.

With reference to the first aspect or the first possible implementation manner of the first aspect, in a second possible implementation manner of the first aspect, before the sending service data to user equipment, the method further includes: sending indication information to the user equipment, where the indication information is used to indicate information about the selected one MCS table and/or the selected one TBS table.

With reference to the first aspect, or the first or second possible implementation manner of the first aspect, in a third possible implementation manner of the first aspect, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

With reference to the third possible implementation manner of the first aspect, in a fourth possible implementation manner of the first aspect, the first MCS table and the first TBS table correspond to LTE Release 12; and the second MCS table and the second TBS table correspond to LTE Releases 8 to 11.

With reference to the third or fourth possible implementation manner of the first aspect, in a fifth possible implementation manner of the first aspect, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

With reference to the third, fourth or fifth possible implementation manner of the first aspect, in a sixth possible implementation manner of the first aspect, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

With reference to the fifth or sixth possible implementation manner of the first aspect, in a seventh possible implementation manner of the first aspect, a modulation scheme corresponding to an MCS level index 28 of the first MCS table is 256-QAM.

With reference to the third or fourth possible implementation manner of the first aspect, in an eighth possible implementation manner of the first aspect, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

With reference to the third, fourth or eighth possible implementation manner of the first aspect, in a ninth possible implementation manner of the first aspect, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

With reference to the eighth or ninth possible implementation manner of the first aspect, in a tenth possible implementation manner of the first aspect, a modulation scheme corresponding to MCS level indexes 27 and 28 of the first MCS table is 256-QAM.

With reference to the third or fourth possible implementation manner of the first aspect, in an eleventh possible implementation manner of the first aspect, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the third, fourth or eleventh possible implementation manner of the first aspect, in a twelfth possible implementation manner of the first aspect, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the eleventh or twelfth possible implementation manner of the first aspect, in a thirteenth possible implementation manner of the first aspect, a modulation scheme corresponding to MCS level indexes 26, 27 and 28 of the first MCS table is 256-QAM.

A second aspect provides a data transmission method, including: selecting one MCS table from at least two modulation coding scheme MCS tables to determine an MCS, and selecting one TBS table from at least two transport block size TBS tables to determine a TBS, where at least one MCS table of the at least two MCS tables includes an MCS corresponding to 256-QAM; and obtaining, based on the determined MCS and the determined TBS, service data sent by a base station.

With reference to the second aspect, in a first possible implementation manner of the second aspect, the method further includes: receiving indication information sent by the base station, where the indication information is used to indicate information about the selected one MCS table and/or the selected one TBS table; and the selecting one MCS table from at least two modulation coding scheme MCS tables to determine a modulation coding scheme MCS, and selecting one TBS table from at least two transport block size TBS tables to determine a TBS includes: selecting the one MCS table from the at least two MCS tables to determine the MCS, and selecting the one TBS table from the at least two transport block size TBS tables to determine the TBS according to the indication information.

With reference to the second aspect or the first possible implementation manner of the second aspect, in a second possible implementation manner of the second aspect, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

With reference to the second possible implementation manner of the second aspect, in a third possible implementation manner of the second aspect, the first MCS table and the first TBS table correspond to LTE Release 12; and the second MCS table and the second TBS table correspond to LTE Releases 8 to 11.

With reference to the second or third possible implementation manner of the second aspect, in a fourth possible implementation manner of the second aspect, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

With reference to the second, third or fourth possible implementation manner of the second aspect, in a fifth possible implementation manner of the second aspect, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

With reference to the fourth or fifth possible implementation manner of the second aspect, in a sixth possible implementation manner of the second aspect, a modulation scheme corresponding to an MCS level index 28 of the first MCS table is 256-QAM.

With reference to the second or third possible implementation manner of the second aspect, in a seventh possible implementation manner of the second aspect, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

With reference to the second, third or seventh possible implementation manner of the second aspect, in an eighth possible implementation manner of the second aspect, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

With reference to the seventh or eighth possible implementation manner of the second aspect, in a ninth possible implementation manner of the second aspect, a modulation scheme corresponding to MCS level indexes 27 and 28 of the first MCS table is 256-QAM.

With reference to the second or third possible implementation manner of the second aspect, in a tenth possible implementation manner of the second aspect, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the second, third or tenth possible implementation manner of the second aspect, in an eleventh possible implementation manner of the second aspect, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the tenth or eleventh possible implementation manner of the second aspect, in a twelfth possible implementation manner of the second aspect, a modulation scheme corresponding to MCS level indexes 26, 27 and 28 of the first MCS table is 256-QAM.

A third aspect provides a base station, including: a selecting and determining unit, configured to select one MCS table from at least two modulation coding scheme MCS tables to determine an MCS, and select one TBS table from at least two transport block size TBS tables to determine a TBS, where at least one MCS table of the at least two MCS tables includes an MCS corresponding to 256 quadrature amplitude modulation QAM; and a sending unit, configured to send service data to user equipment based on the determined MCS and the determined TBS.

With reference to the third aspect, in a first possible implementation manner of the third aspect, the selecting and determining unit includes: a determining subunit, configured to determine a release of a Long Term Evolution LTE system in which the user equipment is located; and a selecting subunit, configured to select the one MCS table from the at least two MCS tables and selecting the one TBS table from the at least two TBS tables according to the release of the LTE system in which the user equipment is located.

With reference to the third aspect or the first possible implementation manner of the third aspect, in a second possible implementation manner of the third aspect, the sending unit is further configured to send indication information to the user equipment, where the indication information is used to indicate information about the selected one MCS table and/or the selected one TBS table.

With reference to the third aspect, or the first or second possible implementation manner of the third aspect, in a third possible implementation manner of the third aspect, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

With reference to the third possible implementation manner of the third aspect, in a fourth possible implementation manner of the third aspect, the first MCS table and the first TBS table correspond to LTE Release 12; and the second MCS table and the second TBS table correspond to LTE Releases 8 to 11.

With reference to the third or fourth possible implementation manner of the third aspect, in a fifth possible implementation manner of the third aspect, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

With reference to the third, fourth or fifth possible implementation manner of the third aspect, in a sixth possible implementation manner of the third aspect, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

With reference to the fifth or sixth possible implementation manner of the third aspect, in a seventh possible implementation manner of the third aspect, a modulation scheme corresponding to an MCS level index 28 of the first MCS table is 256-QAM.

With reference to the third or fourth possible implementation manner of the third aspect, in an eighth possible implementation manner of the third aspect, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

With reference to the third, fourth or eighth possible implementation manner of the third aspect, in a ninth possible implementation manner of the third aspect, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

With reference to the eighth or ninth possible implementation manner of the third aspect, in a tenth possible implementation manner of the third aspect, a modulation scheme corresponding to MCS level indexes 27 and 28 of the first MCS table is 256-QAM.

With reference to the third or fourth possible implementation manner of the third aspect, in an eleventh possible implementation manner of the third aspect, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the third, fourth or eleventh possible implementation manner of the third aspect, in a twelfth possible implementation manner of the third aspect, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the eleventh or twelfth possible implementation manner of the third aspect, in a thirteenth possible implementation manner of the third aspect, a modulation scheme corresponding to MCS level indexes 26, 27 and 28 of the first MCS table is 256-QAM.

A fourth aspect provides user equipment, including: a selecting and determining unit, configured to select one MCS table from at least two modulation coding scheme MCS tables to determine an MCS, and select one TBS table from at least two transport block size TBS tables to determine a TBS, where at least one MCS table of the at least two MCS tables includes an MCS corresponding to 256-QAM; and an obtaining unit, configured to obtain, based on the determined MCS and the determined TBS, service data sent by a base station.

With reference to the fourth aspect, in a first possible implementation manner of the fourth aspect, the obtaining unit is further configured to receive indication information sent by the base station, where the indication information is used to indicate information about the selected one MCS table and/or the selected one TBS table; and the selecting and determining unit is specifically configured to: select the one MCS table from the at least two MCS tables to determine the MCS, and select the one TBS table from the at least two transport block size TBS tables to determine the TBS according to the indication information.

With reference to the fourth aspect or the first possible implementation manner of the fourth aspect, in a second possible implementation manner of the fourth aspect, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

With reference to the second possible implementation manner of the fourth aspect, in a third possible implementation manner of the fourth aspect, the first MCS table and the first TBS table correspond to LTE Release 12; and the second MCS table and the second TBS table correspond to LTE Releases 8 to 11.

With reference to the second or third possible implementation manner of the fourth aspect, in a fourth possible implementation manner of the fourth aspect, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

With reference to the second, third or fourth possible implementation manner of the fourth aspect, in a fifth possible implementation manner of the fourth aspect, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

With reference to the fourth or fifth possible implementation manner of the fourth aspect, in a sixth possible implementation manner of the fourth aspect, a modulation scheme corresponding to an MCS level index 28 of the first MCS table is 256-QAM.

With reference to the second or third possible implementation manner of the fourth aspect, in a seventh possible implementation manner of the fourth aspect, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

With reference to the second, third or seventh possible implementation manner of the fourth aspect, in an eighth possible implementation manner of the fourth aspect, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

With reference to the seventh or eighth possible implementation manner of the fourth aspect, in a ninth possible implementation manner of the fourth aspect, a modulation scheme corresponding to MCS level indexes 27 and 28 of the first MCS table is 256-QAM.

With reference to the second or third possible implementation manner of the fourth aspect, in a tenth possible implementation manner of the fourth aspect, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the second, third or tenth possible implementation manner of the fourth aspect, in an eleventh possible implementation manner of the fourth aspect, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the tenth or eleventh possible implementation manner of the fourth aspect, in a twelfth possible implementation manner of the fourth aspect, a modulation scheme corresponding to MCS level indexes 26, 27 and 28 of the first MCS table is 256-QAM.

A fifth aspect provides a base station, including: a processor and a memory, where the memory stores program code, at least two modulation coding scheme MCS tables and at least two transport block size TBS tables; and the processor is configured to call the program code in the memory to perform the following operations: selecting one MCS table from the at least two modulation coding scheme MCS tables to determine an MCS, and selecting one TBS table from the at least two TBS tables to determine a TBS, where at least one MCS table of the at least two MCS tables includes an MCS corresponding to 256 quadrature amplitude modulation QAM; and sending service data to user equipment based on the determined MCS and the determined TBS.

With reference to the fifth aspect, in a first possible implementation manner of the fifth aspect, the processor is configured to call the program code in the memory to specifically perform the following operations: determining a release of a Long Term Evolution LTE system in which the user equipment is located; and selecting the one MCS table from the at least two MCS tables and selecting the one TBS table from the at least two TBS tables according to the release of the LTE system in which the user equipment is located.

With reference to the fifth aspect or the first possible implementation manner of the fifth aspect, in a second possible implementation manner of the fifth aspect, the processor is configured to call the program code in the memory to further perform the following operation: sending indication information to the user equipment, where the indication information is used to indicate information about the selected one MCS table and/or the selected one TBS table.

With reference to the fifth aspect, or the first or second possible implementation manner of the fifth aspect, in a third possible implementation manner of the fifth aspect, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

With reference to the third possible implementation manner of the fifth aspect, in a fourth possible implementation manner of the fifth aspect, the first MCS table and the first TBS table correspond to LTE Release 12; and the second MCS table and the second TBS table correspond to LTE Releases 8 to 11.

With reference to the third or fourth possible implementation manner of the fifth aspect, in a fifth possible implementation manner of the fifth aspect, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

With reference to the third, fourth or fifth possible implementation manner of the fifth aspect, in a sixth possible implementation manner of the fifth aspect, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

With reference to the fifth or sixth possible implementation manner of the fifth aspect, in a seventh possible implementation manner of the fifth aspect, a modulation scheme corresponding to an MCS level index 28 of the first MCS table is 256-QAM.

With reference to the third or fourth possible implementation manner of the fifth aspect, in an eighth possible implementation manner of the fifth aspect, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

With reference to the third, fourth or eighth possible implementation manner of the fifth aspect, in a ninth possible implementation manner of the fifth aspect, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

With reference to the eighth or ninth possible implementation manner of the fifth aspect, in a tenth possible implementation manner of the fifth aspect, a modulation scheme corresponding to MCS level indexes 27 and 28 of the first MCS table is 256-QAM.

With reference to the third or fourth possible implementation manner of the fifth aspect, in an eleventh possible implementation manner of the fifth aspect, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the third, fourth or eleventh possible implementation manner of the fifth aspect, in a twelfth possible implementation manner of the fifth aspect, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the eleventh or twelfth possible implementation manner of the fifth aspect, in a thirteenth possible implementation manner of the fifth aspect, a modulation scheme corresponding to MCS level indexes 26, 27 and 28 of the first MCS table is 256-QAM.

A sixth aspect provides user equipment, including: a processor and a memory, where the memory stores program code, at least two modulation coding scheme MCS tables and at least two transport block size TBS tables; and the processor is configured to call the program code in the memory to perform the following operations: selecting one MCS table from at least two modulation coding scheme MCS tables to determine an MCS, and selecting one TBS table from at least two transport block size TBS tables to determine a TBS, where at least one MCS table of the at least two MCS tables includes an MCS corresponding to 256-QAM; and obtaining, based on the determined MCS and the determined TBS, service data sent by a base station.

With reference to the sixth aspect, in a first possible implementation manner of the sixth aspect, the processor is configured to call the program code in the memory to specifically perform the following operations: receiving indication information sent by the base station, where the indication information is used to indicate information about the selected one MCS table and/or the selected one TBS table; and selecting the one MCS table from the at least two MCS tables to determine the MCS, and selecting the one TBS table from the at least two transport block size TBS tables to determine the TBS according to the indication information.

With reference to the sixth aspect or the first possible implementation manner of the sixth aspect, in a second possible implementation manner of the sixth aspect, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

With reference to the second possible implementation manner of the sixth aspect, in a third possible implementation manner of the sixth aspect, the first MCS table and the first TBS table correspond to LTE Release 12; and the second MCS table and the second TBS table correspond to LTE Releases 8 to 11.

With reference to the second or third possible implementation manner of the sixth aspect, in a fourth possible implementation manner of the sixth aspect, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

With reference to the second, third or fourth possible implementation manner of the sixth aspect, in a fifth possible implementation manner of the sixth aspect, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

With reference to the fourth or fifth possible implementation manner of the sixth aspect, in a sixth possible implementation manner of the sixth aspect, a modulation scheme corresponding to an MCS level index 28 of the first MCS table is 256-QAM.

With reference to the second or third possible implementation manner of the sixth aspect, in a seventh possible implementation manner of the sixth aspect, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

With reference to the second, third or seventh possible implementation manner of the sixth aspect, in an eighth possible implementation manner of the sixth aspect, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

With reference to the seventh or eighth possible implementation manner of the sixth aspect, in a ninth possible implementation manner of the sixth aspect, a modulation scheme corresponding to MCS level indexes 27 and 28 of the first MCS table is 256-QAM.

With reference to the second or third possible implementation manner of the sixth aspect, in a tenth possible implementation manner of the sixth aspect, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the second, third or tenth possible implementation manner of the sixth aspect, in an eleventh possible implementation manner of the sixth aspect, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

With reference to the tenth or eleventh possible implementation manner of the sixth aspect, in a twelfth possible implementation manner of the sixth aspect, a modulation scheme corresponding to MCS level indexes 26, 27 and 28 of the first MCS table is 256-QAM.

Therefore, in the embodiments of the present disclosure, a base station selects one MCS table from at least two MCS tables to determine an MCS, and selects one TBS table from at least two TBS tables to determine a TBS, and because there are relatively many selection opportunities and specifically corresponding MCS tables and TBS tables may be selected specific to different user equipment attributes, there may be relatively high frequency spectrum efficiency of the system, and there is a relatively high system throughput; and at least one MCS table existing in the at least two MCS tables includes an MCS corresponding to 256-QAM, and therefore when needing to use a relatively high modulation scheme for service data of user equipment, the base station may select the MCS table including the MCS corresponding to the 256-QAM to determine an MCS, thereby further improving the frequency spectrum efficiency of the system, and further improving the system throughput.

BRIEF DESCRIPTION OF THE DRAWINGS

To describe the embodiments more clearly, the following briefly introduces the accompanying drawings required for describing the embodiments or the prior art. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope.

Figure 1:
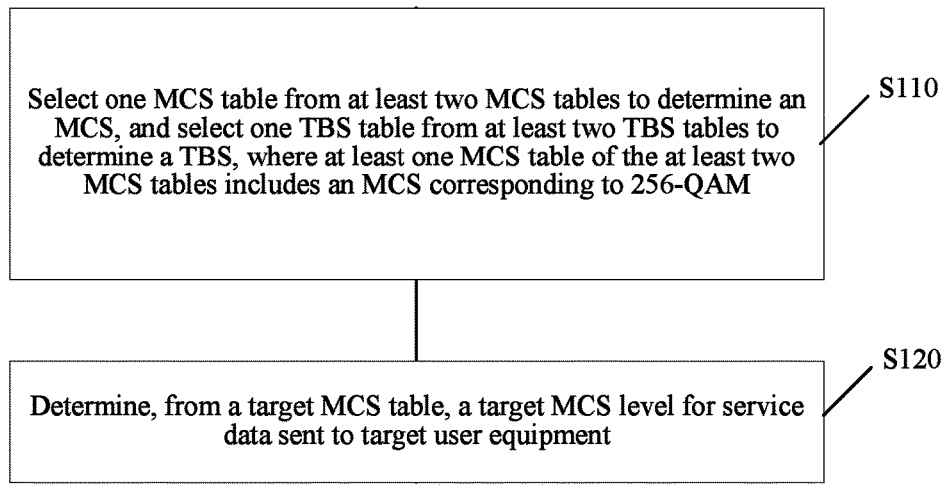
FIG. 1 is a schematic flowchart of a data transmission method according to an embodiment.

FIG. 1 is a schematic flowchart of a data transmission method 100 according to an embodiment. As shown in FIG. 1, the method 100 may include:

S110: Select one MCS table from at least two MCS tables to determine an MCS, and select one TBS table from at least two TBS tables to determine a TBS, where at least one MCS table of the at least two MCS tables includes an MCS corresponding to 256 quadrature amplitude modulation (QAM).

S120: Send service data to user equipment based on the determined MCS and the determined TBS.

Specifically, when needing to send service data to user equipment, a base station may select one MCS table from at least two stored MCS tables, and select one TBS table from at least two stored TBS tables; and the base station may determine, from the selected one TBS table according to a state of a channel between the base station and the user equipment, an MCS level for the service data that needs to be sent, where the determined MCS level may correspond to a modulation scheme and a TBS index; then, the base station may determine, from the selected TBS table according to a quantity of resource block pairs needing to be occupied by the service data needing to be sent to the user equipment and the TBS index, a TBS that transmission of the service data needs to occupy; and then, the base station may send the service data on a corresponding position of a resource block pair according to the modulation scheme corresponding to the MCS level and the determined TBS. At least one MCS table existing in the foregoing at least two tables includes an MCS corresponding to 256-QAM.

Therefore, in the embodiments, a base station selects one MCS table from at least two MCS tables to determine an MCS, and selects one TBS table from at least two TBS tables to determine a TBS, and because there are relatively many selection opportunities and specifically corresponding MCS tables and TBS tables may be selected specific to different user equipment attributes, there may be relatively high frequency spectrum efficiency of the system, and there is a relatively high system throughput; and at least one MCS table existing in the at least two MCS tables includes an MCS corresponding to 256-QAM, and therefore when needing to use a relatively high modulation scheme for service data of user equipment, the base station may select the MCS table including the MCS corresponding to the 256-QAM to determine an MCS, thereby further improving the frequency spectrum efficiency of the system, and further improving the system throughput.

In this embodiment, S110 of selecting one MCS table from at least two MCS tables to determine an MCS, and selecting one TBS table from at least two TBS tables to determine a TBS may include: determining a release of a Long Term Evolution (LTE) system in which the user equipment is located; and selecting the one MCS table from the at least two MCS tables and selecting the one TBS table from the at least two TBS tables according to the release of the LTE system in which the user equipment is located.

Specifically, when determining that service data needs to be sent to user equipment, the base station may first determine a release of an LTE system in which the user equipment is located, and then may select one MCS table from at least two MCS tables to determine an MCS, and select one TBS table from at least two TBS tables to determine a TBS according to the LTE release. Then, the base station may send the service data to the user equipment based on the determined MCS and the determined TBS.

Therefore, in this embodiment, one MCS table is selected from at least two MCS tables to determine an MCS, and one TBS table is selected from at least two TBS tables to determine a TBS based on a release of an LTE system in which user equipment is located; therefore, MCS tables and TBS tables may be set for different attributes of different LTE releases, a problem of decrease in frequency spectrum efficiency of the system caused by a fact that an MCS table and a TBS table do not conform to an attribute of an LTE release may be avoided, resource element (RE) utilization is improved, frequency spectrum efficiency of the system is also improved, and a system throughput may be improved.

Optionally, in this embodiment, an MCS table may be used for storing a correspondence between an MCS level index and a modulation order and a TBS index, where any storage form that can store the correspondence between an MCS level index and a modulation order and a TBS index may be referred to as an MCS table. Optionally, a TBS table may be used for storing a correspondence between a TBS index and a TBS and a resource block size, where any storage form that can store the correspondence between a TBS index and a TBS and a resource block size may be referred to as a TBS table.

Optionally, in this embodiment, an MCS table may cover all MCS level indexes, where an MCS table may exist in a form of multiple MCS subtables, that is, an MCS table covers some MCS level indexes. Optionally, in this embodiment, a TBS table may cover all TBS indexes corresponding to an MCS table corresponding to the one TBS table, where a TBS table may exist in a form of multiple TBS subtables, that is, a TBS subtable covers some TBS indexes.

Optionally, in this embodiment, the foregoing at least two MCS tables may include a first MCS table and a second MCS table, the foregoing at least two TBS tables may include a first TBS table and a second TBS table, the first MCS table cooperates with the first TBS table, and the second MCS table cooperates with the second TBS table. Optionally, the first MCS table includes a 256-QAM modulation scheme, and/or when corresponding to a same MCS level index and a same resource block pair size, a TBS in the first TBS table is not smaller than a TBS in the second TBS table.

In this embodiment, before S120 in which the service data is sent to the user equipment, the method 100 may further include: sending indication information to the user equipment, where the indication information is used to indicate information about the selected one MCS table and/or the selected one TBS table.

That is, before the base station sends the service data to the user equipment, to enable the user equipment to correctly obtain the service data, the base station may inform the user equipment of a set of MCS table and TBS table that is used for the service data. Specifically, the base station may send only information about a selected MCS table to the user equipment, and then the base station may determine an MCS table used by the base station and determine a TBS table corresponding to the MCS table by using the information about the selected MCS table; or the base station may send only information about a selected TBS table to the user equipment, and then the user equipment may determine a TBS table used by the base station and determine an MCS table corresponding to the TBS table by using the information about the selected TBS table; or certainly, the base station may send information about an MCS table and a TBS table that are used to the user equipment, and the user equipment may directly determine, according to the information, the TBS table and the MCS table that are used by the base station.

In this embodiment, the foregoing indication information may be carried by using radio resource control (RRC) signaling or downlink control information (DCI) signaling. In this embodiment, a set of MCS table and TBS table which is used for service data may be implicitly indicated by using an existing bit of DCI bits, for example, a RV field is set to a special value, which denotes that a given set of MCS table and TBS table is used.

In this embodiment, before sending the service data to the user equipment, the base station may further send information about an MCS level (such as an MCS level index) used for the service data and send information about a resource block pair of the service data to the user equipment. Therefore, the user equipment may determine an MCS level from the MCS table used by the base station based on the information about the MCS level used by the base station for the service data, may determine a TBS for the service data based on the determined MCS level and the information about the resource block pair, and therefore may obtain the service data on the resource block pair according to the MCS level and the TBS.

In this embodiment, a field used to indicate information about a used MCS level may be 5 bits, that is, different MCS tables each include 32 MCS level indexes.

For convenience of understanding the present invention, the first MCS table, the first TBS table, the second MCS table and the second TBS table according to this embodiment are described below through examples. It should be understood that, an MCS table and a TBS table that are shown below are only a specific embodiment, and should not constitute any limitation on the protection scope.

Specifically, the aforementioned second MCS table is shown in Table 1 below.

TABLE 1

| MCS index $I_{MCS}$ | Modulation order $Q_m$ | TBS index $I_{TBS}$ |
|---|---|---|
| 0 | 2 | 0 |
| 1 | 2 | 1 |
| 2 | 2 | 2 |
| 3 | 2 | 3 |

TABLE 1-continued

| MCS index $I_{MCS}$ | Modulation order $Q_m$ | TBS index $I_{TBS}$ |
|---|---|---|
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

In the MCS table shown in this embodiment, each MCS level corresponds to one modulation order (2, 4 or 6), and a TBS index ($I_{TBS}$). A modulation order may be used to indicate which modulation scheme is used, for example, 2 represents quadrature phase shift keying (QPSK), 4 represents 16-QAM, and 6 represents 64-QAM, and a size of a TBS needed by data transmission may be obtained by using a TBS index. That is, a TBS may be determined by using a second TBS table shown in Table 2 below and by using a TBS index and a size of a resource block pair that is needed by transmission of service data. It should be understood that, Table 2 shows a TBS table in a case in which there are 0 to 10 resource block pairs. Certainly, a quantity of resource block pairs ($N_{PRB}$) may be also 0 to 20, or other values, and Table 2 is only for a purpose of making exemplary description, and should not constitute any limitation on the present invention.

TABLE 2

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |

TABLE 2-continued

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

The second MCS table and the second TBS table that are mentioned according to this embodiment are shown above by using Table 1 and Table 2 as examples. Optionally, the MCS table and the TBS table that are shown Table 1 and Table 2 above may correspond to LTE Releases 8 to 11.

The aforementioned first MCS table may be different from the second MCS table, and the aforementioned first TBS table may be different from the second TBS table.

In this embodiment, a relationship between the first MCS table and the second MCS table is described below by using examples.

For example, a TBS corresponding to an MCS level index a of the first MCS table may be the same as a TBS corresponding to an MCS level index a+1 of the second MCS table; and/or a modulation scheme corresponding to the MCS level index a of the first MCS table is the same as a modulation scheme corresponding to the MCS level index a+1 of the second MCS table, where a is an integer greater than or equal to 0 and less than or equal to 27. Optionally, a modulation scheme corresponding to an MCS level index 28 of the first MCS table is 256-QAM. Specifically, the first MCS table may be shown in Table 3 below. A modulation order 8 represents that a modulation scheme in use is 256-QAM.

TABLE 3

| MCS index $I_{MCS}$ | Modulation order $Q_m$ | TBS index $I_{TBS}$ |
|---|---|---|
| 0 | 2 | 1 |
| 1 | 2 | 2 |
| 2 | 2 | 3 |
| 3 | 2 | 4 |
| 4 | 2 | 5 |
| 5 | 2 | 6 |
| 6 | 2 | 7 |
| 7 | 2 | 8 |
| 8 | 2 | 9 |
| 9 | 4 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 6 | 15 |
| 17 | 6 | 16 |
| 18 | 6 | 17 |
| 19 | 6 | 18 |
| 20 | 6 | 19 |
| 21 | 6 | 20 |
| 22 | 6 | 21 |
| 23 | 6 | 22 |
| 24 | 6 | 23 |
| 25 | 6 | 24 |
| 26 | 6 | 25 |

TABLE 3-continued

| MCS index $I_{MCS}$ | Modulation order $Q_m$ | TBS index $I_{TBS}$ |
|---|---|---|
| 27 | 6 | 26 |
| 28 | 8 | 27 |
| 29 | 2 | Reserved |
| 30 | 4 | |
| 31 | 6 | |

For another example, a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table; and/or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27. Optionally, a modulation scheme corresponding to an MCS level index 28 of the first MCS table is 256-QAM. Specifically, the first MCS table may be shown in Table 4 below.

TABLE 4

| MCS index $I_{MCS}$ | Modulation order $Q_m$ | TBS index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 6 | 15 |
| 17 | 6 | 16 |
| 18 | 6 | 17 |
| 19 | 6 | 18 |
| 20 | 6 | 19 |

TABLE 4-continued

| MCS index $I_{MCS}$ | Modulation order $Q_m$ | TBS index $I_{TBS}$ |
|---|---|---|
| 21 | 6 | 20 |
| 22 | 6 | 21 |
| 23 | 6 | 22 |
| 24 | 6 | 23 |
| 25 | 6 | 24 |
| 26 | 6 | 25 |
| 27 | 6 | 26 |
| 28 | 8 | 27 |
| 29 | 2 | Reserved |
| 30 | 4 | |
| 31 | 6 | |

For another example, a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table; and/or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27. Optionally, a modulation scheme corresponding to an MCS level index 28 of the first MCS table is 256-QAM. Specifically, the first MCS table may be shown in Table 5 below.

TABLE 5

| MCS index $I_{MCS}$ | Modulation order $Q_m$ | TBS index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 16 |
| 18 | 6 | 17 |
| 19 | 6 | 18 |
| 20 | 6 | 19 |
| 21 | 6 | 20 |
| 22 | 6 | 21 |
| 23 | 6 | 22 |
| 24 | 6 | 23 |
| 25 | 6 | 24 |
| 26 | 6 | 25 |
| 27 | 6 | 26 |
| 28 | 8 | 27 |
| 29 | 2 | Reserved |
| 30 | 4 | |
| 31 | 6 | |

For another example, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table; and/or a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26. Optionally, a modulation scheme corresponding to MCS level indexes 27 and 28 of the first MCS table is 256-QAM. Specifically, the first MCS table may be shown in Table 6 below.

TABLE 6

| MCS index $I_{MCS}$ | Modulation order $Q_m$ | TBS index $I_{TBS}$ |
|---|---|---|
| 0 | 2 | 1 |
| 1 | 2 | 2 |
| 2 | 2 | 3 |
| 3 | 2 | 4 |
| 4 | 2 | 5 |
| 5 | 2 | 6 |
| 6 | 2 | 7 |
| 7 | 2 | 8 |
| 8 | 2 | 9 |
| 9 | 4 | 10 |
| 10 | 4 | 11 |
| 11 | 4 | 12 |
| 12 | 4 | 13 |
| 13 | 4 | 14 |
| 14 | 4 | 15 |
| 15 | 6 | 15 |
| 16 | 6 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 6 | 25 |
| 26 | 6 | 26 |
| 27 | 8 | 27 |
| 28 | 8 | 28 |
| 29 | 2 | Reserved |
| 30 | 4 | |
| 31 | 6 | |

For another example, a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; and/or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26. Optionally, a modulation scheme corresponding to MCS level indexes 27 and 28 of the first MCS table is 256-QAM. Specifically, the first MCS table may be shown in Table 7 below.

TABLE 7

| MCS index $I_{MCS}$ | Modulation order $Q_m$ | TBS index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 6 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 6 | 25 |
| 26 | 6 | 26 |
| 27 | 8 | 27 |
| 28 | 8 | 28 |
| 29 | 2 | Reserved |
| 30 | 4 | |
| 31 | 6 | |

For another example, a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26; and/or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26. Optionally, a modulation scheme corresponding to MCS level indexes 27 and 28 of the first MCS table is 256-QAM. Specifically, the first MCS table may be shown in Table 8 below.

TABLE 8

| MCS index $I_{MCS}$ | Modulation order $Q_m$ | TBS index $I_{TBS}$ |
|---|---|---|
| 0 | 2 | 1 |
| 1 | 2 | 2 |
| 2 | 2 | 3 |
| 3 | 2 | 4 |
| 4 | 2 | 5 |
| 5 | 2 | 6 |
| 6 | 2 | 7 |
| 7 | 2 | 8 |
| 8 | 2 | 9 |
| 9 | 4 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 6 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 6 | 25 |
| 26 | 6 | 26 |
| 27 | 8 | 27 |
| 28 | 8 | 28 |
| 29 | 2 | Reserved |
| 30 | 4 | |
| 31 | 6 | |

For another example, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25; and/or a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25. Optionally, a modulation scheme corresponding to MCS level indexes 26, 27 and 28 of the first MCS table is 256-QAM. Specifically, the first MCS table may be shown in Table 9 below.

TABLE 9

| MCS index $I_{MCS}$ | Modulation order $Q_m$ | TBS index $I_{TBS}$ |
|---|---|---|
| 0 | 2 | 1 |
| 1 | 2 | 2 |
| 2 | 2 | 3 |
| 3 | 2 | 4 |
| 4 | 2 | 5 |
| 5 | 2 | 6 |
| 6 | 2 | 7 |
| 7 | 2 | 8 |
| 8 | 2 | 9 |
| 9 | 4 | 10 |
| 10 | 4 | 11 |
| 11 | 4 | 12 |
| 12 | 4 | 13 |
| 13 | 4 | 14 |
| 14 | 4 | 15 |
| 15 | 6 | 16 |
| 16 | 6 | 17 |
| 17 | 6 | 18 |
| 18 | 6 | 19 |
| 19 | 6 | 20 |
| 20 | 6 | 21 |
| 21 | 6 | 22 |
| 22 | 6 | 23 |
| 23 | 6 | 24 |
| 24 | 6 | 25 |
| 25 | 6 | 26 |
| 26 | 8 | 27 |
| 27 | 8 | 28 |
| 28 | 8 | 29 |
| 29 | 2 | Reserved |
| 30 | 4 | |
| 31 | 6 | |

It should be understood that, forms of the MCS tables and the TBS tables shown Table 1 to Table 9 above should not constitute a limitation on this embodiment. For example, a TBS index A and a TBS that corresponds to a resource block pair size B in the first TBS table matching the MCS table shown in any one of Table 3 to Table 9 above may be the same as a TBS index A and a TBS that corresponds to a resource block pair size B in the second TBS table. However, TBS indexes in an MCS table shown in Table 3 to Table 9 above may be also arranged sequentially from 0 to 28, and in this case, a TBS index A and a TBS that corresponds to a resource block pair quantity B in the first TBS table matching the MCS table shown in any one of Table 3 to Table 9 above are not necessarily the same as a TBS index A and a TBS that corresponds to a resource block pair quantity B in the second TBS table. For example, for Table 3, in a case of a same resource block pair size, a TBS corresponding to an MCS level index a of the first MCS table may be the same as a TBS corresponding to an MCS level index a+1 of the second MCS table, that is, in a case of a same resource block pair size, if a TBS index corresponding to a first MCS level index a is C and a TBS index corresponding to a second MCS level index a+1 is D, a TBS corresponding to a TBS index C in the first TBS table is the same as a TBS corresponding to a TBS index D in the second TBS table.

In this embodiment, the aforementioned first MCS table and first TBS table may correspond to LTE Release 12; and the aforementioned second MCS table and second TBS table may correspond to LTE Releases 8 to 11.

In the prior art, an MCS table and a TBS table corresponding to Releases 8 to 11 are directly used for each LTE system in Release 12. In this embodiment, for user equipment corresponding to LTE Release 12, if the first MCS table is used, the first MCS table may include a 256-QAM modulation scheme, and therefore in this case, when a signal to interference plus noise ratio (SINR) corresponding to a small cell enhancement (SCE) scenario in Release 12 is relatively large, the base station may modulate, by using a higher modulation scheme, that is, the 256-QAM modulation scheme, service data sent by the user equipment in the scenario, thereby improving frequency spectrum used by efficiency, and increasing a system throughput.

Moreover, because in a case of a same MCS level and a same resource block pair quantity, a TBS in the first TBS table is not smaller than a TBS in the second TBS table, and in this case, in a new carrier type (NCT) scenario in LTE Release 12, because there is no physical downlink control channel (PDCCH) area or cell-specific reference signal (CRS) area, and there is only a demodulation reference signal (DMRS) area, there may be more REs that are used for transmitting service data, and therefore encoding efficiency of sending the service data to the user equipment in the scenario may be improved by using the first TBS table.

For an LTE system in Release 12 (which may be specifically in an NCT scenario), statistics is collected on encoding efficiency obtained when the first MCS table and the first TBS table are used and encoding efficiency obtained when the second MCS table and the second TBS table corresponding to Releases 8 to 11 in the prior art are used, where the encoding efficiency obtained when the first MCS table and the first TBS table are used is obviously higher than the encoding efficiency obtained when the second MCS table and the second TBS table corresponding to Releases 8 to 11 are used. Table 10 below shows encoding efficiency obtained when an MCS table and a TBS table corresponding to Releases 8 to 11 are used when a quantity of resource block pairs is 20 in a scenario of an LTE system in Release 12; and Table 11 below shows encoding efficiency obtained when a first MCS table shown in Table 9 and a TBS corresponding to the first MCS table are used when a quantity of resource block pairs is 20 in a scenario of an LTE system in Release 12.

TABLE 10

| MCS index | Modulation order | TBS index | TBS | Target coding rate | Effective coding rate |
|---|---|---|---|---|---|
| | 2 | 0 | 536 | 0.1172 | 0.0897 |
| 1 | 2 | 1 | 712 | 0.1533 | 0.1179 |
| 2 | 2 | 2 | 872 | 0.1885 | 0.1436 |
| 3 | 2 | 3 | 1160 | 0.2451 | 0.1897 |
| 4 | 2 | 4 | 1416 | 0.3008 | 0.2308 |
| 5 | 2 | 5 | 1736 | 0.3701 | 0.2821 |
| 6 | 2 | 6 | 2088 | 0.4385 | 0.3385 |
| 7 | 2 | 7 | 2472 | 0.5137 | 0.4 |
| 8 | 2 | 8 | 2792 | 0.5879 | 0.4513 |
| 9 | 2 | 9 | 3112 | 0.6631 | 0.5026 |
| 10 | 4 | 9 | 3112 | 0.332 | 0.2513 |
| 11 | 4 | 10 | 3496 | 0.3691 | 0.2821 |
| 12 | 4 | 11 | 4008 | 0.4238 | 0.3231 |
| 13 | 4 | 12 | 4584 | 0.4785 | 0.3692 |
| 14 | 4 | 13 | 5160 | 0.54 | 0.4154 |
| 15 | 4 | 14 | 5736 | 0.6016 | 0.4615 |
| 16 | 4 | 15 | 6200 | 0.6426 | 0.5026 |
| 17 | 6 | 15 | 6200 | 0.4277 | 0.335 |
| 18 | 6 | 16 | 6456 | 0.4551 | 0.348 |
| 19 | 6 | 17 | 7224 | 0.5049 | 0.3897 |
| 20 | 6 | 18 | 7992 | 0.5537 | 0.4308 |
| 21 | 6 | 19 | 8504 | 0.6016 | 0.4581 |
| 22 | 6 | 20 | 9144 | 0.6504 | 0.4923 |
| 23 | 6 | 21 | 9912 | 0.7021 | 0.5333 |
| 24 | 6 | 22 | 10680 | 0.7539 | 0.5744 |
| 25 | 6 | 23 | 11448 | 0.8027 | 0.6154 |
| 26 | 6 | 24 | 12216 | 0.8525 | 0.6564 |

TABLE 10-continued

| MCS index | Modulation order | TBS index | TBS | Target coding rate | Effective coding rate |
|---|---|---|---|---|---|
| 27 | 6 | 25 | 12576 | 0.8887 | 0.6769 |
| 28 | 6 | 26 | 14688 | 0.9258 | 0.7897 |
| 29 | 2 | Reserved | | | |
| 30 | 4 | | | | |
| 31 | 6 | | | | |

TABLE 11

| MCS index | Modulation order | TBS index | TBS | Target coding rate | Effective coding rate |
|---|---|---|---|---|---|
| 0 | 2 | 1 | 712 | 0.1172 | 0.1179 |
| 1 | 2 | 2 | 872 | 0.1533 | 0.1436 |
| 2 | 2 | 3 | 1160 | 0.1885 | 0.1897 |
| 3 | 2 | 4 | 1416 | 0.2451 | 0.2308 |
| 4 | 2 | 5 | 1736 | 0.3008 | 0.2821 |
| 5 | 2 | 6 | 2088 | 0.3701 | 0.3385 |
| 6 | 2 | 7 | 2472 | 0.4385 | 0.4 |
| 7 | 2 | 8 | 2792 | 0.5137 | 0.4513 |
| 8 | 2 | 9 | 3112 | 0.5879 | 0.5026 |
| 9 | 4 | 10 | 3496 | 0.6631 | 0.5642 |
| 10 | 4 | 11 | 4008 | 0.332 | 0.3231 |
| 11 | 4 | 12 | 4584 | 0.3691 | 0.3692 |
| 12 | 4 | 13 | 5160 | 0.4238 | 0.4154 |
| 13 | 4 | 14 | 5736 | 0.4785 | 0.4615 |
| 14 | 4 | 15 | 6200 | 0.54 | 0.5026 |
| 15 | 6 | 16 | 6456 | 0.6016 | 0.6974 |
| 16 | 6 | 17 | 7224 | 0.6426 | 0.7794 |
| 17 | 6 | 18 | 7992 | 0.4277 | 0.4308 |
| 18 | 6 | 19 | 8504 | 0.4551 | 0.4581 |
| 19 | 6 | 20 | 9144 | 0.5049 | 0.4923 |
| 20 | 6 | 21 | 9912 | 0.5537 | 0.5333 |
| 21 | 6 | 22 | 10680 | 0.6016 | 0.5744 |
| 22 | 6 | 23 | 11448 | 0.6504 | 0.6154 |
| 23 | 6 | 24 | 12216 | 0.7021 | 0.6564 |
| 24 | 6 | 25 | 12576 | 0.7539 | 0.6769 |
| 25 | 6 | 26 | 14688 | 0.8027 | 0.7897 |
| 26 | 8 | 27 | | 0.8525 | |
| 27 | 8 | 28 | | 0.8887 | |
| 28 | 8 | 29 | | 0.9258 | |
| 29 | 2 | Reserved | | | |
| 30 | 4 | | | | |
| 31 | 6 | | | | |

TBSs corresponding to TBS indexes 27, 28 and 29 in Table 11 may be set according to a specific situation, and are not limited herein in this embodiment.

Therefore, it can be seen from Table 10 and Table 11 above that, an effective coding rate obtained when the first MCS table and the first TBS table in this embodiment are used to determine an MCS level of the user equipment corresponding to Release 12 and a TBS is obviously higher than an effective coding rate obtained when the second MCS table and the second TBS table are used to determine an MCS level of the user equipment corresponding to Release 12 and a TBS, and is very close to a target coding rate.

Therefore, in this embodiment, a base station selects one MCS table from at least two MCS tables to determine an MCS, and selects one TBS table from at least two TBS tables to determine a TBS, and because there are relatively many selection opportunities and different MCS tables and TBS tables may be selected specific to different user equipment attributes, there may be relatively high frequency spectrum efficiency of the system, and there is a relatively high system throughput; and at least one MCS table existing in the at least two MCS tables includes an MCS corresponding to 256-QAM, and therefore when needing to use a relatively high modulation scheme for service data of user equipment, the base station may select the MCS table including the MCS corresponding to the 256-QAM to determine an MCS, thereby further improving the frequency spectrum efficiency of the system, and further improving the system throughput.

The data transmission method in the embodiments is described above from a base station side, and the data transmission method in the embodiments is described below from a user equipment side.

Figure 2:
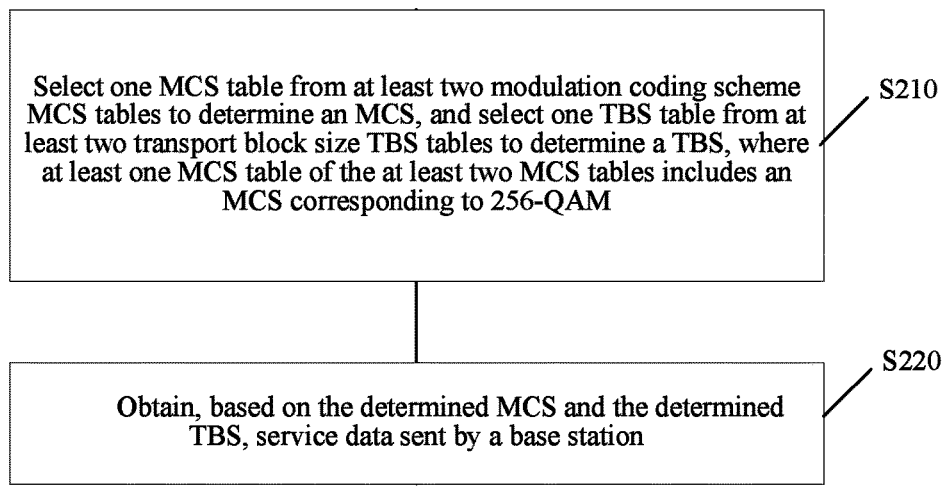
FIG. 2 is a schematic flowchart of a data transmission method according to another embodiment.

FIG. 2 is a schematic flowchart of a data transmission method 200 according to an embodiment. As shown in FIG. 2, the method 200 includes:

S210: Select one MCS table from at least two modulation coding scheme MCS tables to determine an MCS, and select one TBS table from at least two transport block size TBS tables to determine a TBS, where at least one MCS table of the at least two MCS tables includes an MCS corresponding to 256-QAM.

S220: Obtain, based on the determined MCS and the determined TBS, service data sent by a base station.

Specifically, when determining that service data sent by a base station needs to be received, user equipment may select one MCS table from at least two stored MCS tables, and select one TBS table from at least two stored TBS tables; and then, may determine, from the selected one TBS table, an MCS level for the service data needing to be received, where the determined MCS level may correspond to a modulation scheme and a TBS index; then, the user equipment may determine, according to a size of a resource block pair occupied by the service data needing to be received and the TBS index, a TBS occupied by the service data; therefore, the user equipment may obtain, according to the modulation scheme corresponding to the MCS level and the determined TBS, the service data sent by the base station. At least one MCS table existing in the foregoing at least two tables includes an MCS corresponding to 256-QAM.

Therefore, in this embodiment, one MCS table is selected from at least two MCS tables to determine an MCS, and one TBS table is selected from at least two TBS tables to determine a TBS; because there are relatively many selection opportunities, there may be relatively high frequency spectrum efficiency of the system, and there is a relatively high system throughput; and at least one MCS table existing in the at least two MCS tables includes an MCS corresponding to 256-QAM, and therefore when needing to use a relatively high modulation scheme for service data of user equipment, the base station may select the MCS table including the MCS corresponding to the 256-QAM to determine an MCS, thereby further improving the frequency spectrum efficiency of the system, and further improving the system throughput.

Optionally, in this embodiment, an MCS table may be used for storing a correspondence between an MCS level index and a modulation order and a TBS index, where any storage form that can store the correspondence between an MCS level index and a modulation order and a TBS index may be referred to as an MCS table. Optionally, a TBS table may be used for storing a correspondence between a TBS index and a TBS and a resource block size, where any storage form that can store the correspondence between a TBS index and a TBS and a resource block size may be referred to as a TBS table.

Optionally, in this embodiment, an MCS table may cover all MCS level indexes, where an MCS table may exist in a form of multiple MCS subtables, that is, an MCS table covers some MCS level indexes. Optionally, in this embodiment, a TBS table may cover all TBS indexes corresponding to an MCS table corresponding to the one TBS table, where a TBS table may exist in a form of multiple TBS subtables, that is, a TBS subtable covers some TBS indexes.

Optionally, in this embodiment, the foregoing at least two MCS tables may include a first MCS table and a second MCS table, the foregoing at least two TBS tables may include a first TBS table and a second TBS table, the first MCS table cooperates with the first TBS table, and the second MCS table cooperates with the second TBS table. Optionally, the first MCS table includes a 256-QAM modulation scheme, and/or when corresponding to a same MCS level index and a same resource block pair size, a TBS in the first TBS table is not smaller than a TBS in the second TBS table.

In this embodiment, the method 100 may further include: receiving indication information sent by the base station, where the indication information is used to indicate information about the selected one MCS table and/or the selected one TBS table. Correspondingly, S210 of selecting one MCS table from at least two modulation coding scheme MCS tables to determine a modulation coding scheme MCS, and selecting one TBS table from at least two transport block size TBS tables to determine a TBS may include: selecting the one MCS table from the at least two MCS tables to determine the MCS, and selecting the one TBS table from the at least two transport block size TBS tables to determine the TBS according to the indication information.

That is, before the base station sends the service data to the user equipment, to enable the user equipment to correctly obtain the service data, the base station may inform the user equipment of a set of MCS table and TBS table that is used for the service data. Specifically, the base station may send only information about a selected MCS table to the user equipment, and then the base station may determine an MCS table used by the base station and determine a TBS table corresponding to the MCS table by using the information about the selected MCS table; or the base station may send only information about a selected TBS table to the user equipment, and then the user equipment may determine a TBS table used by the base station and determine an MCS table corresponding to the TBS table by using the information about the selected TBS table; or certainly, the base station may send information about an MCS table and a TBS table that are used to the user equipment, and the user equipment may directly determine, according to the information, the TBS table and the MCS table that are used by the base station.

In this embodiment, before sending the service data to the user equipment, the base station may further send information about an MCS level (such as an MCS level index) used for the service data and send information about a resource block pair of the service data to the user equipment. Therefore, the user equipment may determine an MCS level from the MCS table used by the base station based on the information about the MCS level used by the base station for the service data, may determine a TBS for the service data based on the determined MCS level and the information about the resource block pair, and therefore may obtain the service data on the resource block pair according to the MCS level and the TBS.

For convenience of understanding the present invention, the first MCS table, the first TBS table, the second MCS table and the second TBS table according to this embodiment are described below through examples. It should be understood that, an MCS table and a TBS table that are shown below are only a specific embodiment, and should not constitute any limitation on the protection scope. Specifically, the aforementioned second MCS table and second TBS table may be shown in Table 1 and Table 2 above respectively.

The aforementioned first MCS table may be different from the second MCS table, and the aforementioned first TBS table may be different from the second TBS table.

In this embodiment, a relationship between the first MCS table and the second MCS table is described below through examples.

For example, a TBS corresponding to an MCS level index a of the first MCS table may be the same as a TBS corresponding to an MCS level index a+1 of the second MCS table; and/or a modulation scheme corresponding to the MCS level index a of the first MCS table is the same as a modulation scheme corresponding to the MCS level index a+1 of the second MCS table, where a is an integer greater than or equal to 0 and less than or equal to 27. Optionally, a modulation scheme corresponding to an MCS level index 28 of the first MCS table is 256-QAM. Specifically, the first MCS table may be shown in Table 3 above.

For another example, a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table; and/or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27. Optionally, a modulation scheme corresponding to an MCS level index 28 of the first MCS table is 256-QAM. Specifically, the first MCS table may be shown in Table 4 above.

For another example, a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table; and/or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27. Optionally, a modulation scheme corresponding to an MCS level index 28 of the first MCS table is 256-QAM. Specifically, the first MCS table may be shown in Table 5 above.

For another example, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table; and/or a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26. Optionally, a modulation scheme corresponding to MCS level indexes 27 and 28 of the first MCS table is 256-QAM. Specifically, the first MCS table may be shown in Table 6 above.

For another example, a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; and/or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26. Optionally, a modulation scheme corresponding to MCS level indexes 27 and 28 of the first MCS table is 256-QAM. Specifically, the first MCS table may be shown in Table 7 above.

For another example, a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26; and/or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26. Optionally, a modulation scheme corresponding to MCS level indexes 27 and 28 of the first MCS table is 256-QAM. Specifically, the first MCS table may be shown in Table 8 above.

For another example, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25; and/or a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25. Optionally, a modulation scheme corresponding to MCS level indexes 26, 27 and 28 of the first MCS table is 256-QAM. Specifically, the first MCS table may be shown in Table 9 above.

In this embodiment, the aforementioned first MCS table and first TBS table may correspond to LTE Release 12; and the aforementioned second MCS table and second TBS table may correspond to LTE Releases 8 to 11.

Therefore, in this embodiment, one MCS table is selected from at least two MCS tables to determine an MCS, and one TBS table is selected from at least two TBS tables to determine a TBS; because there are relatively many selection opportunities, there may be relatively high frequency spectrum efficiency of the system, and there is a relatively high system throughput; and at least one MCS table existing in the at least two MCS tables includes an MCS corresponding to 256-QAM, and therefore when needing to use a relatively high modulation scheme for service data of user equipment, the base station may select the MCS table including the MCS corresponding to the 256-QAM to determine an MCS, thereby further improving the frequency spectrum efficiency of the system, and further improving the system throughput.

Figure 3:
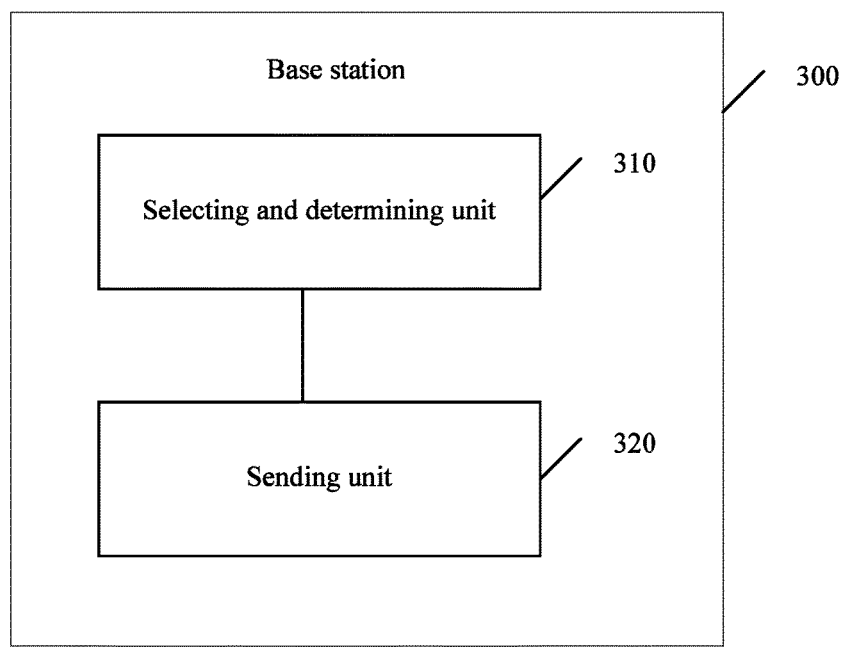
FIG. 3 is a schematic block diagram of a base station according to another embodiment.

FIG. 3 is a schematic block diagram of a base station 300 according to an embodiment. As shown in FIG. 3, the base station 300 includes: a selecting and determining unit 310, configured to select one MCS table from at least two modulation coding scheme MCS tables to determine an MCS, and select one TBS table from at least two transport block size TBS tables to determine a TBS, where at least one MCS table of the at least two MCS tables includes an MCS corresponding to 256 quadrature amplitude modulation QAM; and a sending unit 320, configured to send service data to user equipment based on the determined MCS and the determined TBS.

Figure 4:
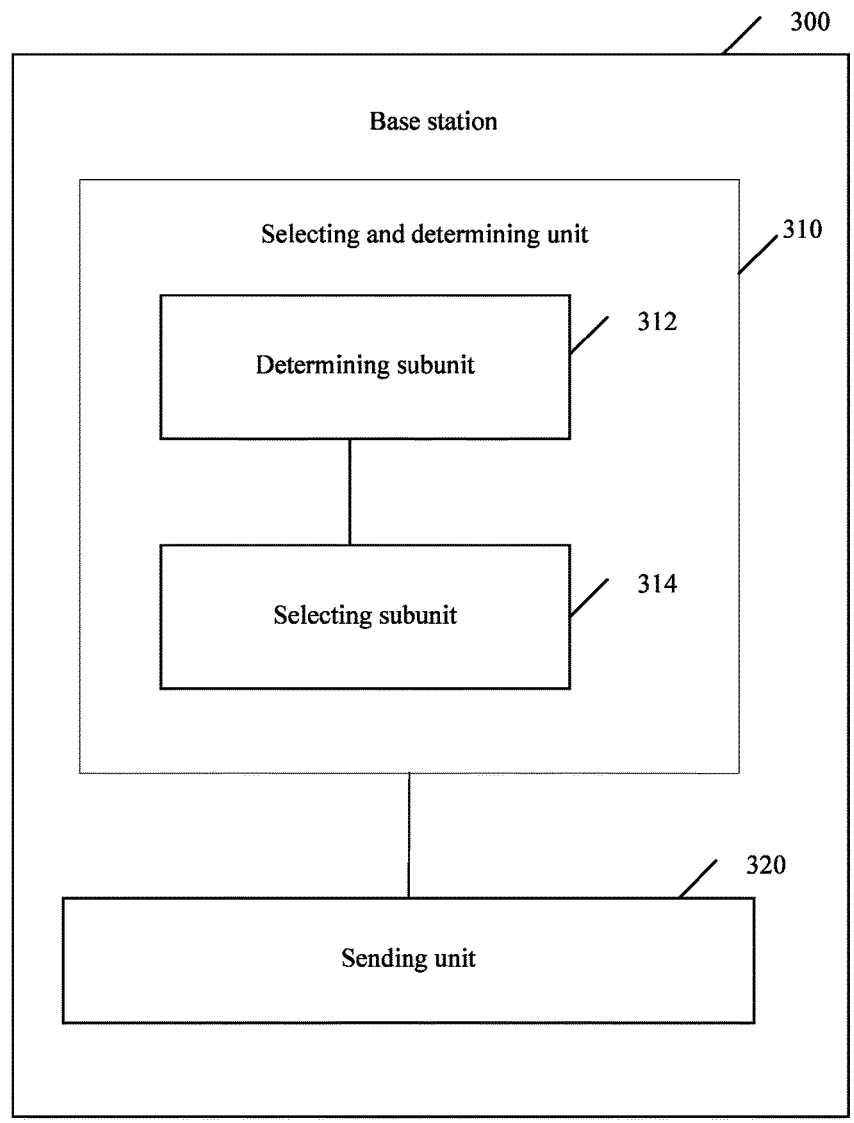
FIG. 4 is a schematic block diagram of a base station according to another embodiment.

Optionally, as shown in FIG. 4, the selecting and determining unit 310 includes: a determining subunit 312, configured to determine a release of a Long Term Evolution LTE system in which the user equipment is located; and a selecting subunit 314, configured to select the one MCS table from the at least two MCS tables and selecting the one TBS table from the at least two TBS tables according to the release of the LTE system in which the user equipment is located.

Optionally, the sending unit 320 is further configured to send indication information to the user equipment, where the indication information is used to indicate information about the selected one MCS table and/or the selected one TBS table.

Optionally, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

Optionally, the first MCS table and the first TBS table correspond to LTE Release 12; and the second MCS table and the second TBS table correspond to LTE Releases 8 to 11.

Optionally, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

Optionally, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

Optionally, a modulation scheme corresponding to an MCS level index 28 of the first MCS table is 256-QAM.

Optionally, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

Optionally, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

Optionally, a modulation scheme corresponding to MCS level indexes 27 and 28 of the first MCS table is 256-QAM.

Optionally, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

Optionally, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

Optionally, a modulation scheme corresponding to MCS level indexes 26, 27 and 28 of the first MCS table is 256-QAM.

It should be understood that, the base station 300 according to this embodiment may correspond to a base station in a data transmission method in an embodiment, and details are not described herein again for the purpose of conciseness.

Therefore, in the embodiments, a base station selects one MCS table from at least two MCS tables to determine an MCS, and selects one TBS table from at least two TBS tables to determine a TBS, and because there are relatively many selection opportunities and specifically corresponding MCS tables and TBS tables may be selected specific to different user equipment attributes, there may be relatively high frequency spectrum efficiency of the system, and there is a relatively high system throughput; and at least one MCS table existing in the at least two MCS tables includes an MCS corresponding to 256-QAM, and therefore when needing to use a relatively high modulation scheme for service data of user equipment, the base station may select the MCS table including the MCS corresponding to the 256-QAM to determine an MCS, thereby further improving the frequency spectrum efficiency of the system, and further improving the system throughput.

Figure 5:
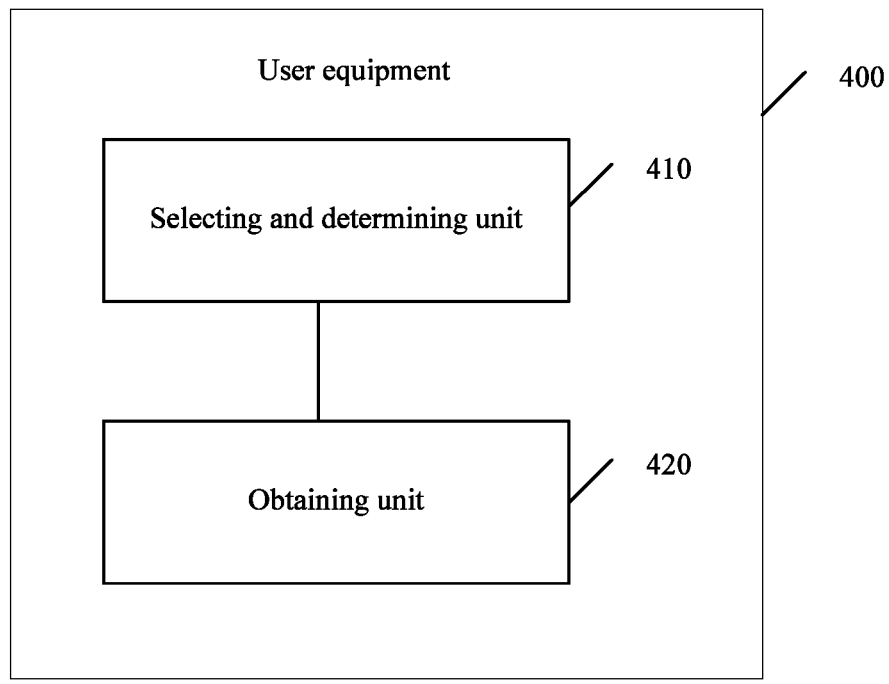
FIG. 5 is a schematic block diagram of user equipment according to another embodiment.

FIG. 5 is a schematic block diagram of user equipment 400 according to an embodiment. As shown in FIG. 5, the user equipment 400 includes: a selecting and determining unit 410, configured to select one MCS table from at least two modulation coding scheme MCS tables to determine an MCS, and select one TBS table from at least two transport block size TBS tables to determine a TBS, where at least one MCS table of the at least two MCS tables includes an MCS corresponding to 256-QAM; and an obtaining unit 420, configured to obtain, based on the determined MCS and the determined TBS, service data sent by a base station.

Optionally, the obtaining unit 420 is further configured to receive indication information sent by the base station, where the indication information is used to indicate information about the selected one MCS table and/or the selected one TBS table; and the selecting and determining unit 410 is specifically configured to: select the one MCS table from the at least two MCS tables to determine the MCS, and select the one TBS table from the at least two transport block size TBS tables to determine the TBS according to the indication information.

Optionally, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

Optionally, the first MCS table and the first TBS table correspond to LTE Release 12; and the second MCS table and the second TBS table correspond to LTE Releases 8 to 11.

Optionally, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

Optionally, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

Optionally, a modulation scheme corresponding to an MCS level index 28 of the first MCS table is 256-QAM.

Optionally, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

Optionally, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

Optionally, a modulation scheme corresponding to MCS level indexes 27 and 28 of the first MCS table is 256-QAM.

Optionally, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

Optionally, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

Optionally, a modulation scheme corresponding to MCS level indexes 26, 27 and 28 of the first MCS table is 256-QAM.

It should be understood that, the user equipment 400 according to this embodiment may correspond to user equipment in a data transmission method in an embodiment, and details are not described herein again for the purpose of conciseness.

Therefore, in this embodiment, one MCS table is selected from at least two MCS tables to determine an MCS, and one TBS table is selected from at least two TBS tables to determine a TBS; because there are relatively many selection opportunities, there may be relatively high frequency spectrum efficiency of the system, and there is a relatively high system throughput; and at least one MCS table existing in the at least two MCS tables includes an MCS corresponding to 256-QAM, and therefore when needing to use a relatively high modulation scheme for service data of user equipment, the base station may select the MCS table including the MCS corresponding to the 256-QAM to determine an MCS, thereby further improving the frequency spectrum efficiency of the system, and further improving the system throughput.

Figure 6:
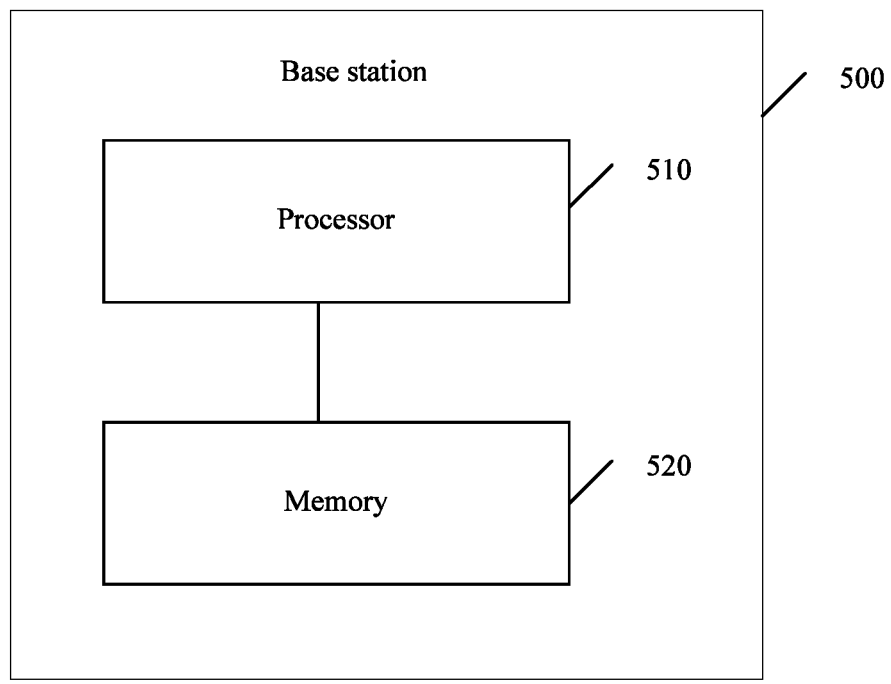
FIG. 6 is a schematic block diagram of a base station according to another embodiment.

FIG. 6 is a schematic block diagram of a base station 500 according to an embodiment. The base station 500 includes a processor 510 and a memory 520, where the memory 520 stores program code, at least two modulation coding scheme MCS tables and at least two transport block size TBS tables; and the processor 510 is configured to call the program code in the memory 520 to perform the following operations: selecting one MCS table from the at least two modulation coding scheme MCS tables to determine an MCS, and selecting one TBS table from the at least two TBS tables to determine a TBS, where at least one MCS table of the at least two MCS tables includes an MCS corresponding to 256 quadrature amplitude modulation QAM; and sending service data to user equipment based on the determined MCS and the determined TBS.

Optionally, the processor 510 is configured to call the program code in the memory 520 to specifically perform the following operations: determining a release of a Long Term Evolution LTE system in which the user equipment is located; and selecting the one MCS table from the at least two MCS tables and selecting the one TBS table from the at least two TBS tables according to the release of the LTE system in which the user equipment is located.

Optionally, the processor 510 is configured to call the program code in the memory 520 to further perform the following operation: sending indication information to the user equipment, where the indication information is used to indicate information about the selected one MCS table and/or the selected one TBS table.

Optionally, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

Optionally, the first MCS table and the first TBS table correspond to LTE Release 12; and the second MCS table and the second TBS table correspond to LTE Releases 8 to 11.

Optionally, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

Optionally, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

Optionally, a modulation scheme corresponding to an MCS level index 28 of the first MCS table is 256-QAM.

Optionally, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

Optionally, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

Optionally, a modulation scheme corresponding to MCS level indexes 27 and 28 of the first MCS table is 256-QAM.

Optionally, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

Optionally, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

Optionally, a modulation scheme corresponding to MCS level indexes 26, 27 and 28 of the first MCS table is 256-QAM.

It should be understood that, the base station 500 according to this embodiment may correspond to a base station in a data transmission method in an embodiment, and details are not described herein again for the purpose of conciseness.

Therefore, in this embodiment, a base station selects one MCS table from at least two MCS tables to determine an MCS, and selects one TBS table from at least two TBS tables to determine a TBS, and because there are relatively many selection opportunities and specifically corresponding MCS tables and TBS tables may be selected specific to different user equipment attributes, there may be relatively high frequency spectrum efficiency of the system, and there is a relatively high system throughput; and at least one MCS table existing in the at least two MCS tables includes an MCS corresponding to 256-QAM, and therefore when needing to use a relatively high modulation scheme for service data of user equipment, the base station may select the MCS table including the MCS corresponding to the 256-QAM to determine an MCS, thereby further improving the frequency spectrum efficiency of the system, and further improving the system throughput.

Figure 7:
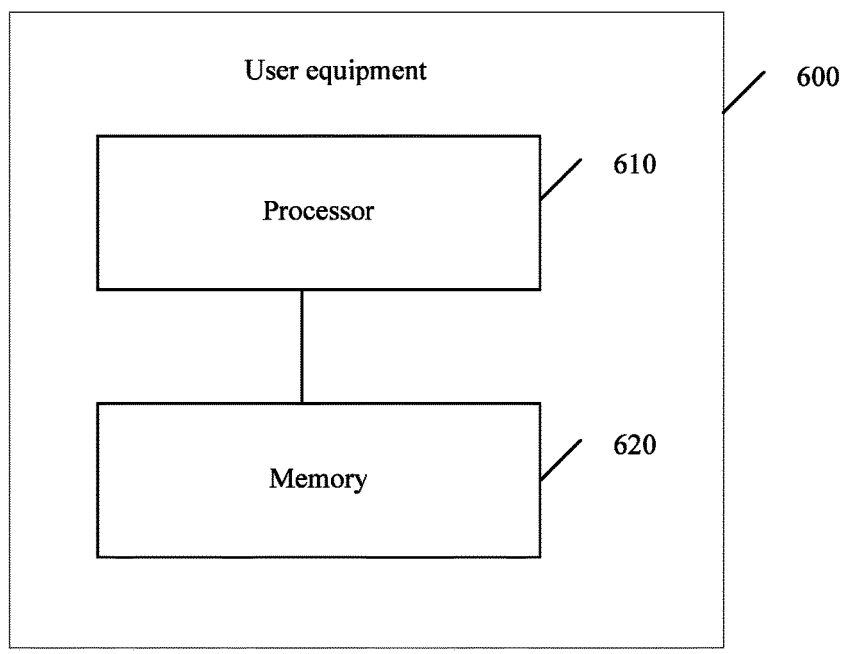
FIG. 7 is a schematic block diagram of user equipment according to another embodiment.

FIG. 7 is a schematic block diagram of user equipment 600 according to an embodiment. As shown in FIG. 7, the user equipment 600 includes: a processor 610 and a memory 620, where the memory 620 stores program code, at least two modulation coding scheme MCS tables and at least two transport block size TBS tables; and the processor 610 is configured to call the program code in the memory 620 to perform the following operations: selecting one MCS table from at least two modulation coding scheme MCS tables to determine an MCS, and selecting one TBS table from at least two transport block size TBS tables to determine a TBS, where at least one MCS table of the at least two MCS tables includes an MCS corresponding to 256-QAM; and obtaining, based on the determined MCS and the determined TBS, service data sent by a base station.

Optionally, the processor 610 is configured to call the program code in the memory 620 to specifically perform the following operations: receiving indication information sent by the base station, where the indication information is used to indicate information about the selected one MCS table and/or the selected one TBS table; and selecting the one MCS table from the at least two MCS tables to determine the MCS, and selecting the one TBS table from the at least two transport block size TBS tables to determine the TBS according to the indication information.

Optionally, the at least two MCS tables include a first MCS table and a second MCS table, the at least two TBS tables include a first TBS table and a second TBS table, the first MCS table cooperates with the first TBS table, and the second MCS table cooperates with the second TBS table, where the first MCS table includes a 256-QAM modulation scheme, and/or when corresponding to a same MCS level index and a same resource block pair size, a TBS in the first TBS table is not smaller than a TBS in the second TBS table.

Optionally, the first MCS table and the first TBS table correspond to LTE Release 12; and the second MCS table and the second TBS table correspond to LTE Releases 8 to 11.

Optionally, a TBS corresponding to an MCS level index a of the first MCS table is the same as a TBS corresponding to an MCS level index a+1 of the second MCS table, where a is an integer greater than or equal to 0 and less than or equal to 27; or a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, where b is an integer greater than or equal to 0 and less than or equal to 9, and c is an integer greater than or equal to 10 and less than or equal to 27; or a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, where d is an integer greater than or equal to 0 and less than or equal to 16, and e is an integer greater than or equal to 17 and less than or equal to 27.

Optionally, a modulation scheme corresponding to the MCS level index a of the first MCS table is the same as a modulation scheme corresponding to the MCS level index a+1 of the second MCS table, where a is an integer greater than or equal to 0 and less than or equal to 27; or a modulation scheme corresponding to the MCS level index b of the first MCS table is the same as a modulation scheme corresponding to the MCS level index b of the second MCS table, and a modulation scheme corresponding to the MCS level index c of the first MCS table is the same as a modulation scheme corresponding to the MCS level index c+1 of the second MCS table, where b is an integer greater than or equal to 0 and less than or equal to 9, and c is an integer greater than or equal to 10 and less than or equal to 27; or a modulation scheme corresponding to the MCS level index d of the first MCS table is the same as a modulation scheme corresponding to the MCS level index d of the second MCS table, and a modulation scheme corresponding to the MCS level index e of the first MCS table is the same as a modulation scheme corresponding to the MCS level index e+1 of the second MCS table, where d is an integer greater than or equal to 0 and less than or equal to 16, and e is an integer greater than or equal to 17 and less than or equal to 27.

Optionally, a modulation scheme corresponding to an MCS level index 28 of the first MCS table is 256-QAM.

Optionally, a TBS corresponding to an MCS level index f of the first MCS table is the same as a TBS corresponding to an MCS level index f+1 of the second MCS table, and a TBS corresponding to an MCS level index h of the first MCS table is the same as a TBS corresponding to an MCS level index h+2 of the second MCS table, where f is an integer greater than or equal to 0 and less than or equal to 8, and h is an integer greater than or equal to 9 and less than or equal to 26; or a TBS corresponding to an MCS level index i of the first MCS table is the same as a TBS corresponding to an MCS level index i of the second MCS table, a TBS corresponding to an MCS level index g of the first MCS table is the same as a TBS corresponding to an MCS level index g+1 of the second MCS table, and a TBS corresponding to an MCS level index k of the first MCS table is the same as a TBS corresponding to an MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a TBS corresponding to an MCS level index m of the first MCS table is the same as a TBS corresponding to an MCS level index m+1 of the second MCS table, and a TBS corresponding to an MCS level index n of the first MCS table is the same as a TBS corresponding to an MCS level index n+2 of the second MCS table, where m is an integer greater than or equal to 0 and less than or equal to 15, and n is an integer greater than or equal to 16 and less than or equal to 26.

Optionally, a modulation scheme corresponding to the MCS level index f of the first MCS table is the same as a modulation scheme corresponding to the MCS level index f+1 of the second MCS table, and a modulation scheme corresponding to the MCS level index h of the first MCS table is the same as a modulation scheme corresponding to the MCS level index h+2 of the second MCS table, where f is an integer greater than or equal to 0 and less than or equal to 8, and h is an integer greater than or equal to 9 and less than or equal to 26; or a modulation scheme corresponding to the MCS level index i of the first MCS table is the same as a modulation scheme corresponding to the MCS level index i of the second MCS table, a modulation scheme corresponding to the MCS level index g of the first MCS table is the same as a modulation scheme corresponding to the MCS level index g+1 of the second MCS table, and a modulation scheme corresponding to the MCS level index k of the first MCS table is the same as a modulation scheme corresponding to the MCS level index k+2 of the second MCS table, where i is an integer greater than or equal to 0 and less than or equal to 9, g is an integer greater than or equal to 10 and less than or equal to 15, and k is an integer greater than or equal to 16 and less than or equal to 26; or a modulation scheme corresponding to the MCS level index m of the first MCS table is the same as a modulation scheme corresponding to the MCS level index m+1 of the second MCS table, and a modulation scheme corresponding to the MCS level index n of the first MCS table is the same as a modulation scheme corresponding to the MCS level index n+2 of the second MCS table, where m is an integer greater than or equal to 0 and less than or equal to 15, and n is an integer greater than or equal to 16 and less than or equal to 26.

Optionally, a modulation scheme corresponding to MCS level indexes 27 and 28 of the first MCS table is 256-QAM.

Optionally, a TBS corresponding to an MCS level index p of the first MCS table is the same as a TBS corresponding to an MCS level index p+1 of the second MCS table, a TBS corresponding to an MCS level index x of the first MCS table is the same as a TBS corresponding to an MCS level index x+2 of the second MCS table, and a TBS corresponding to an MCS level index y of the first MCS table is the same as a TBS corresponding to an MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

Optionally, a modulation scheme corresponding to the MCS level index p of the first MCS table is the same as a modulation scheme corresponding to the MCS level index p+1 of the second MCS table, a modulation scheme corresponding to the MCS level index x of the first MCS table is the same as a modulation scheme corresponding to the MCS level index x+2 of the second MCS table, and a modulation scheme corresponding to the MCS level index y of the first MCS table is the same as a modulation scheme corresponding to the MCS level index y+3 of the second MCS table, where p is an integer greater than or equal to 0 and less than or equal to 8, x is an integer greater than or equal to 9 and less than or equal to 14, and y is an integer greater than or equal to 15 and less than or equal to 25.

Optionally, a modulation scheme corresponding to MCS level indexes 26, 27 and 28 of the first MCS table is 256-QAM.

It should be understood that, the user equipment 600 according to this embodiment may correspond to user equipment in a data transmission method in an embodiment, and details are not described herein again for the purpose of conciseness.

Therefore, in this embodiment, one MCS table is selected from at least two MCS tables to determine an MCS, and one TBS table is selected from at least two TBS tables to determine a TBS; because there are relatively many selection opportunities, there may be relatively high frequency spectrum efficiency of the system, and there is a relatively high system throughput; and at least one MCS table existing in the at least two MCS tables includes an MCS corresponding to 256-QAM, and therefore when needing to use a relatively high modulation scheme for service data of user equipment, the base station may select the MCS table including the MCS corresponding to the 256-QAM to determine an MCS, thereby further improving the frequency spectrum efficiency of the system, and further improving the system throughput.

A person of ordinary skill in the art may be aware that, the exemplary units and algorithm steps described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions essentially, or the part contributing to the prior art, or some of the technical solutions may be implemented in a form of a software product. The computer software product is stored in a storage medium, and includes several instructions for instructing a computer device, which may be a personal computer, a server, or a network device, to perform all or some of the steps of the methods described in the embodiments. The foregoing storage medium includes: any medium that can store program code, such as a USB flash drive, a portable hard drive, a read-only memory (ROM), a random access memory (RAM), a magnetic disk, or an optical disc.

The foregoing descriptions are merely specific embodiments, but are not intended to limit the protection scope. Any variation or replacement readily figured out by a person skilled in the art within the technical scope disclosed in the present invention shall fall within the protection scope. Therefore, the protection scope shall be subject to the protection scope of the claims.

What is claimed is:

1. A data transmission method, comprising:
   selecting, by a base station, one modulation coding scheme (MCS) table from at least two MCS tables, and selecting one transport block size (TBS) table from at least two TBS tables, wherein at least one MCS table of the at least two MCS tables comprises an MCS corresponding to 256 quadrature amplitude modulation (QAM);
   determining, by the base station, from the selected one TBS table based on a state of a channel between the base station and a terminal, an MCS level for data needing to be sent to the terminal, where the determined MCS level corresponds to a modulation scheme and a TBS index;
   determining, from the selected TBS table based on the TBS index and a quantity of resource block pairs needing to be occupied by the data, a TBS that transmission of the data needs to occupy;
   sending the data to the terminal based on the determined MCS level and the determined TBS;
   wherein the at least two MCS tables comprise a first MCS table and a second MCS table, wherein the at least two TBS tables comprise a first TBS table and a second TBS table, wherein the first MCS table cooperates with the first TBS table, and the second MCS table cooperates with the second TBS table;
   wherein a TBS in the first TBS table is not smaller than a TBS in the second TBS table when the TBS in the first TBS table and the TBS in the second TBS table correspond to a same MCS level index and a same resource block pair size; and
   wherein a TBS corresponding to an MCS level index a of the first MCS table is the same as a TBS corresponding to an MCS level index a+1 of the second MCS table, wherein a is an integer greater than or equal to 0 and less than or equal to 27.

2. The method according to claim 1, wherein the selecting one MCS table from the at least two MCS tables, and selecting the one TBS table from the at least two TBS tables comprises:
   determining a release of a Long Term Evolution (LTE) system in which the terminal is located; and
   selecting the one MCS table from the at least two MCS tables and selecting the one TBS table from the at least two TBS tables according to the release of the LTE system in which the terminal is located.

3. The method according to claim 1, wherein the method further comprises:
   sending indication information to the terminal before the sending data to the terminal, wherein the indication information indicates information about at least one of the selected one MCS table and the selected one TBS table.

4. The method according to claim 1, wherein the first MCS table and the first TBS table correspond to LTE Release 12; and wherein the second MCS table and the second TBS table correspond to LTE Releases 8 to 11.

5. The method according to claim 1, wherein the first MCS table comprises a 256-QAM modulation scheme.

6. A data transmission method, comprising:
   selecting, by a terminal, one modulation coding scheme (MCS) table from at least two MCS tables, and selecting one transport block size (TBS) table from at least two TBS tables, wherein at least one MCS table of the at least two MCS tables comprises an MCS corresponding to 256-QAM;
   determining, by the terminal, from the selected one TBS table, an MCS level for service data needing to be received, where the determined MCS level corresponds to a modulation scheme and a TBS index;
   determining, by the terminal, based on the TBS index and a quantity of a resource block pair occupied by the data needing to be received, a TBS occupied by the data; and
   obtaining, based on the determined MCS level and the determined TBS, data sent by a base station.

7. The method according to claim 6, wherein the method further comprises:
   receiving indication information sent by the base station, wherein the indication information indicates information about at least one of the selected one MCS table and the selected one TBS table; and
   wherein the selecting the one MCS table from the at least two MCS tables, and selecting the one TBS table from the at least two TBS tables comprises:
   selecting the one MCS table from the at least two MCS tables, and selecting the one TBS table from the at least two TBS tables according to the indication information.

8. The method according to claim 6, wherein the at least two MCS tables comprise a first MCS table and a second MCS table, wherein the at least two TBS tables comprise a first TBS table and a second TBS table, wherein the first MCS table cooperates with the first TBS table, and the second MCS table cooperates with the second TBS table; and wherein the first MCS table comprises a 256-QAM modulation scheme.

9. The method according to claim 8, wherein the first MCS table and the first TBS table correspond to LTE Release 12; and wherein the second MCS table and the second TBS table correspond to LTE Releases 8 to 11.

10. The method according to claim 8, wherein a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, wherein b is an integer greater than or equal to 0 and less than or equal to 9, and c is an integer greater than or equal to 10 and less than or equal to 27.

11. The method according to claim 8, a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, wherein d is an integer greater than or equal to 0 and less than or equal to 16, and e is an integer greater than or equal to 17 and less than or equal to 27.

12. A base station, comprising:
a processor; and
a non-transitory computer readable medium connected to the processor and storing program code, at least two modulation coding scheme (MCS) tables and at least two transport block size (TBS) tables, wherein the program code has instructions causing the processor to perform:
selecting one MCS table from the at least two MCS tables, and selecting one TBS table from the at least two TBS tables, wherein at least one MCS table of the at least two MCS tables comprises an MCS corresponding to 256 quadrature amplitude modulation QAM;
determining, from the selected one TBS table based on a state of a channel between the base station and a terminal, an MCS level for data needing to be sent to the terminal, where the determined MCS level corresponds to a modulation scheme and a TBS index;
determining, from the selected TBS table based on the TBS index and a quantity of resource block pairs needing to be occupied by the data, a TBS that transmission of the data needs to occupy; and
sending data to the terminal based on the determined MCS level and the determined TBS;
wherein the at least two MCS tables comprise a first MCS table and a second MCS table, wherein the at least two TBS tables comprise a first TBS table and a second TBS table, wherein the first MCS table cooperates with the first TBS table, and the second MCS table cooperates with the second TBS table;
wherein a TBS in the first TBS table is not smaller than a TBS in the second TBS table when the TBS in the first TBS table and the TBS in the second TBS table correspond to a same MCS level index and a same resource block pair size; and
wherein a TBS corresponding to an MCS level index a of the first MCS table is the same as a TBS corresponding to an MCS level index a+1 of the second MCS table, wherein a is an integer greater than or equal to 0 and less than or equal to 27.

13. The base station according to claim 12, wherein the program code further has instructions causing the processor to perform:
determining a release of a Long Term Evolution (LTE) system in which the terminal is located; and
selecting the one MCS table from the at least two MCS tables and selecting the one TBS table from the at least two TBS tables according to the release of the LTE system in which the terminal is located.

14. The base station according to claim 12, wherein the program code further has instructions causing the processor to perform:
sending indication information to the terminal, wherein the indication information indicates information about at least one of the selected one MCS table and the selected one TBS table.

15. The base station according to claim 12, wherein the first MCS table comprises a 256-QAM modulation scheme.

16. The base station according to claim 12, wherein the first MCS table and the first TBS table correspond to LTE Release 12; and wherein the second MCS table and the second TBS table correspond to LTE Releases 8 to 11.

17. A terminal, comprising:
a processor; and
a non-transitory computer readable medium connected to the processor and storing program code, at least two modulation coding scheme (MCS) tables and at least two transport block size (TBS) tables, wherein the program code has instructions causing the processor to perform:
selecting one MCS table from at least two modulation coding scheme MCS tables, and selecting one TBS table from at least two transport block size TBS tables, wherein at least one MCS table of the at least two MCS tables comprises an MCS corresponding to 256-QAM;
determining, from the selected one TBS table, an MCS level for service data needing to be received, where the determined MCS level corresponds to a modulation scheme and a TBS index;
determining, by the terminal, based on the TBS index and a quantity of a resource block pair occupied by the data, a TBS occupied by the data; and
obtaining, based on the determined MCS and the determined TBS, data sent by a base station;
wherein the at least two MCS tables comprise a first MCS table and a second MCS table, wherein the at least two TBS tables comprise a first TBS table and a second TBS table, wherein the first MCS table cooperates with the first TBS table, and the second MCS table cooperates with the second TBS table;
wherein a TBS in the first TBS table is not smaller than a TBS in the second TBS table when the TBS in the first TBS table and the TBS in the second TBS table correspond to a same MCS level index and a same resource block pair size; and
wherein a TBS corresponding to an MCS level index a of the first MCS table is the same as a TBS corresponding to an MCS level index a+1 of the second MCS table, wherein a is an integer greater than or equal to 0 and less than or equal to 27.

18. The terminal according to claim 17, wherein the program code further has instructions causing the processor to perform:
receiving indication information sent by the base station, wherein the indication information indicates information about at least one the selected one MCS table and the selected one TBS table; and selecting the one MCS table from the at least two MCS tables to determine the MCS, and selecting the one TBS table from the at least two transport block size TBS tables to determine the TBS according to the indication information.

19. The terminal according to claim 17, wherein the at least two MCS tables comprise a first MCS table and a second MCS table, wherein the at least two TBS tables comprise a first TBS table and a second TBS table, wherein the first MCS table cooperates with the first TBS table, and wherein the second MCS table cooperates with the second TBS table; and wherein the first MCS table comprises a 256-QAM modulation scheme.

20. The terminal according to claim 17, wherein the first MCS table and the first TBS table correspond to LTE Release 12; and the second MCS table and the second TBS table correspond to LTE Releases 8 to 11.

21. The terminal according to claim 17, wherein a TBS corresponding to an MCS level index b of the first MCS table is the same as a TBS corresponding to an MCS level index b of the second MCS table, and a TBS corresponding to an MCS level index c of the first MCS table is the same as a TBS corresponding to an MCS level index c+1 of the second MCS table, wherein b is an integer greater than or equal to 0 and less than or equal to 9, and c is an integer greater than or equal to 10 and less than or equal to 27.

22. The terminal according to claim 17, wherein a TBS corresponding to an MCS level index d of the first MCS table is the same as a TBS corresponding to an MCS level index d of the second MCS table, and a TBS corresponding to an MCS level index e of the first MCS table is the same as a TBS corresponding to an MCS level index e+1 of the second MCS table, wherein d is an integer greater than or equal to 0 and less than or equal to 16, and e is an integer greater than or equal to 17 and less than or equal to 27.

* * * * *